C. W. GRUNDEMAN.
SAW SET.
APPLICATION FILED JUNE 30, 1914.
1,128,776.
Patented Feb. 16, 1915.
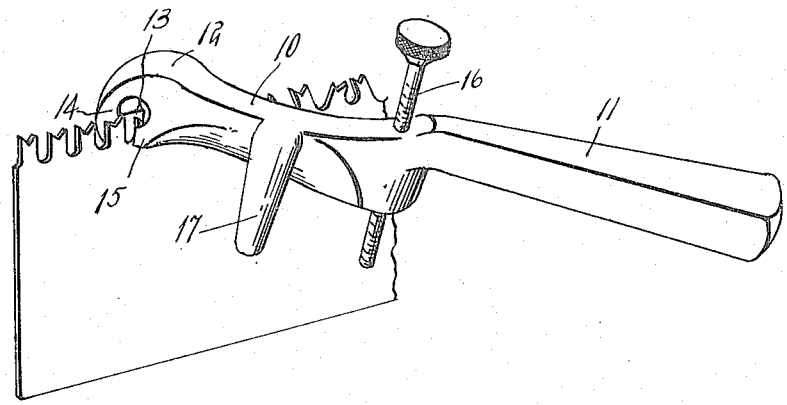
FIG. I.
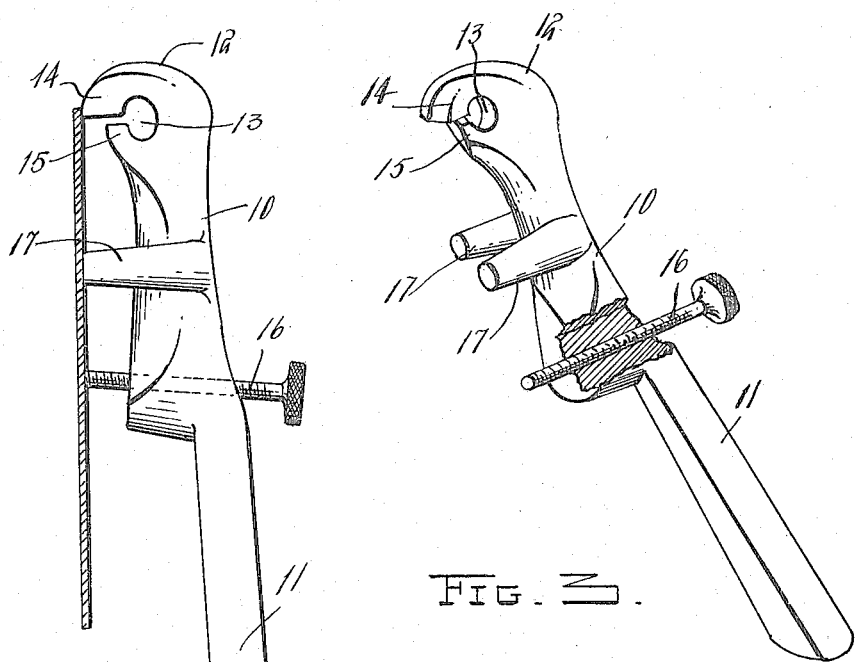
FIG. 2.
FIG. 3.
Witnesses
J. C. Simpson
Henry T. Bright
Inventor
C. W. Grundeman
By Chandler & Chandler
Attorneys

UNITED STATES PATENT OFFICE.

CARL W. GRUNDEMAN, OF NETAWAKA, KANSAS.

SAW-SET.

1,128,776. Specification of Letters Patent. Patented Feb. 16, 1915.

Application filed June 30, 1914. Serial No. 848,209.

*To all whom it may concern:*

Be it known that I, CARL W. GRUNDEMAN, a citizen of the United States, residing at Netawaka, in the county of Jackson, State of Kansas, have invented certain new and useful Improvements in Saw-Sets; and I do hereby declare the following to be a full, clear, and exact description of the invention, such as will enable others skilled in the art to which it appertains to make and use the same.

This invention relates to saw sets.

The object of the invention resides in the provision of a tool of the type named in which is embodied improved means for setting the teeth at the desired angle and also means whereby the set of the teeth may be readily gaged.

With the above and others objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view showing the manner of utilizing the improved saw set to effect the setting of the teeth; Fig. 2, a side view of the saw set showing same used for gaging the set of a tooth; and Fig. 3, a perspective view of the saw set partly in section.

Referring to the drawings the improved saw set is shown as comprising a body 10 one end of which is offset to form a handle 11, while the other end thereof is enlarged to form a head 12. This head 12 is provided with a transverse recess 13 opening through one side of the head and forming coöperating setting jaws 14 and 15, the former being longer than the latter and the recess 13 being of a width between the ends of the jaws 14 and 15 equal substantially to the thickness of a saw blade. Mounted in the body 10 adjacent the inner end of the offset portion 11 is an adjusting screw 16. Formed integral with the body 10 between the screw 16 and the head 12 are laterally extending diverging arms 17, said arms being of equal length.

In the use of the device the tooth to be set is engaged in the recess 13 between the ends of the jaws 14 and 15. The handle 11 is then pressed down until the desired set of the tooth is had.

To gage the set of the tooth the screw 16 is properly adjusted and the adjacent ends of the screw 16 and arms 17 are placed against the side of the saw and the device moved to bring the end of the tooth to be gaged into engagement with the outer side of the end of the jaw 14. If the end of the tooth will not touch this side of the jaw 14 under the conditions mentioned it should be again set until the desired result is had.

What is claimed is:—

A saw set comprising a body having one end offset to form a handle and its other end enlarged to form a head, said head being provided with a transverse recess opening through one side thereof and forming coöperating setting jaws the inner setting jaw being of less length than the outer setting jaw, a transverse adjusting screw mounted in the body adjacent the inner end of the offset portion, and diverging lateral arms carried by the body between the head and set screw, said arms extending in the same general direction as said jaws.

In testimony whereof, I affix my signature, in the presence of two witnesses.

CARL W. GRUNDEMAN.

Witnesses:
OTTO SMEK,
ALMA YOUNG.

Copies of this patent may be obtained for five cents each, by addressing the "Commissioner of Patents. Washington, D. C."